Oct. 17, 1933.　　　A. P. DAVIDSON　　　1,930,966
INCUBATOR
Filed Aug. 11, 1928　　　2 Sheets-Sheet 1
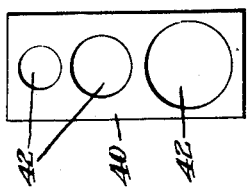
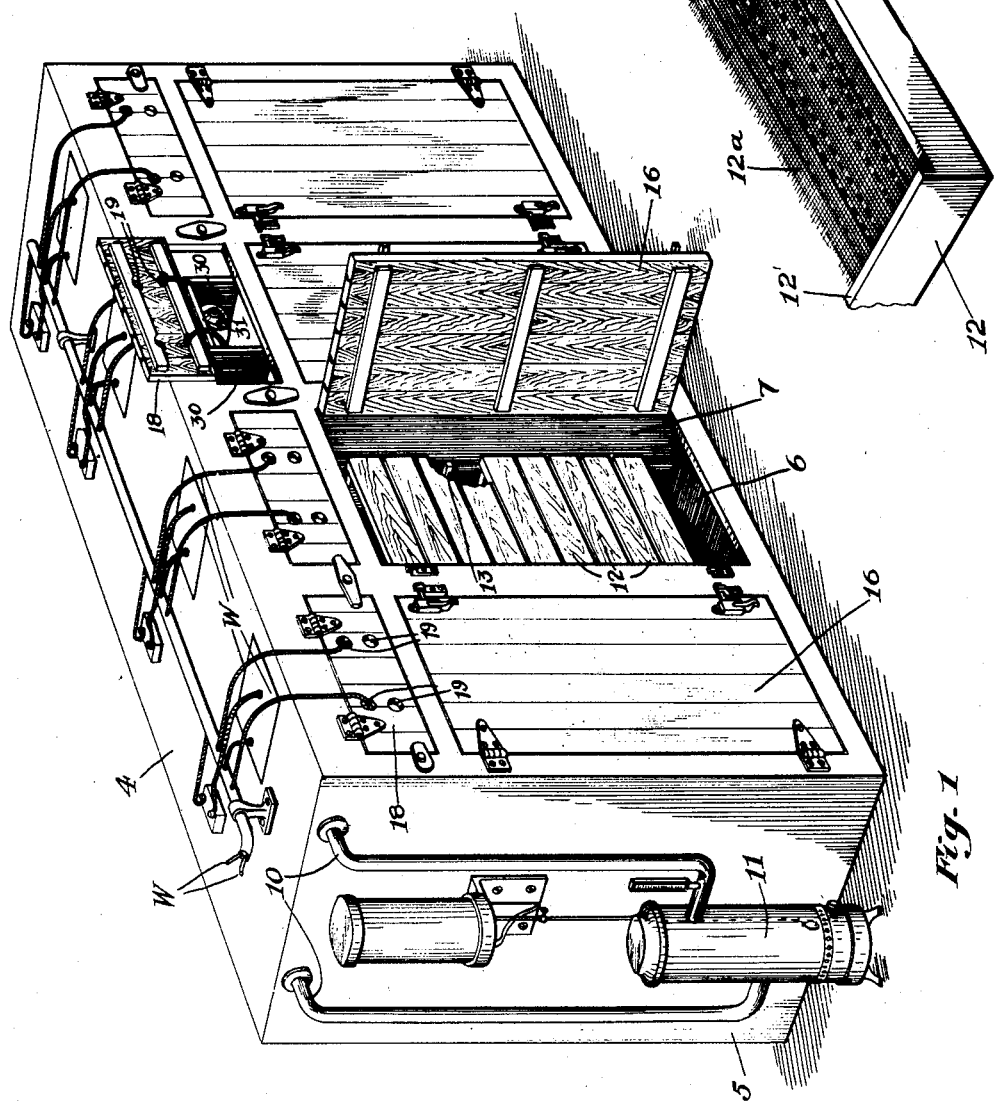
Inventor:
Albert P. Davidson
BY
Attorney.

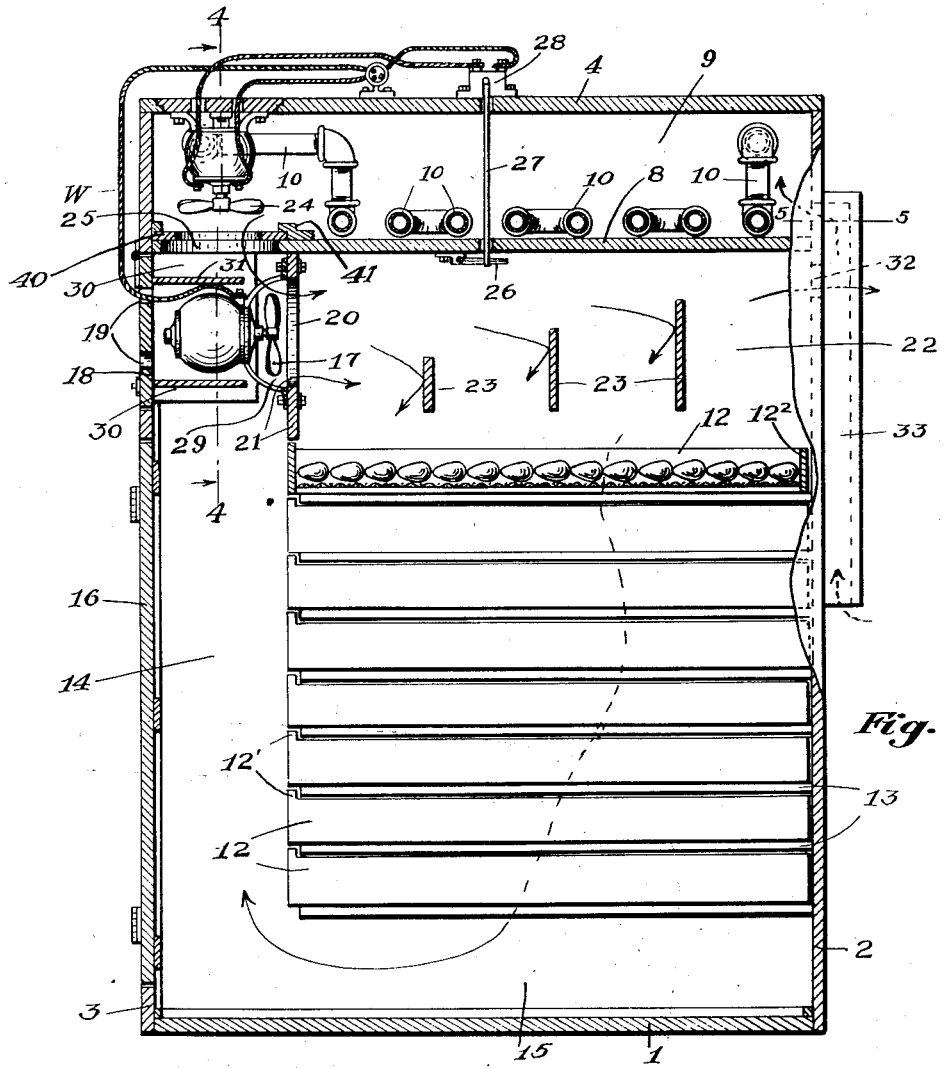
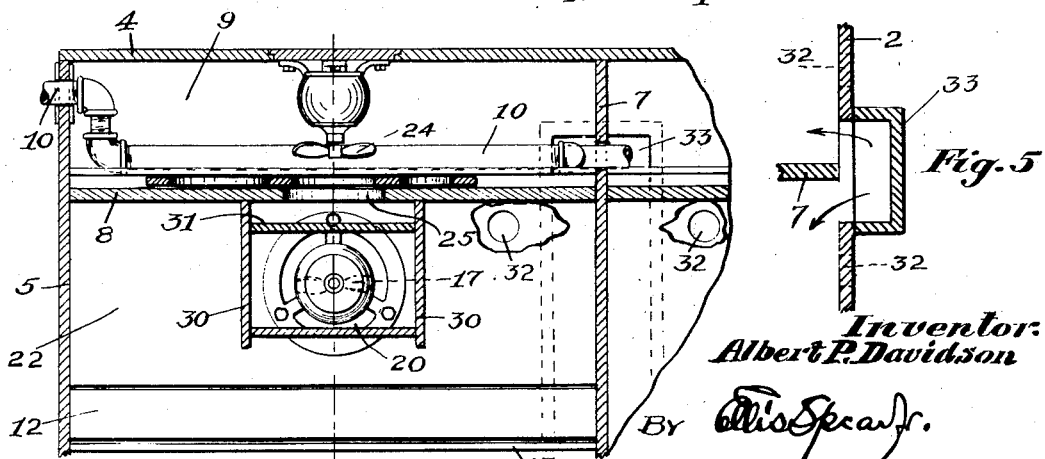

Patented Oct. 17, 1933

1,930,966

UNITED STATES PATENT OFFICE 1,930,966

INCUBATOR

Albert Porter Davidson, Center Conway, N. H.

Application August 11, 1928. Serial No. 298,911

26 Claims. (Cl. 119—35)

This invention relates to incubators and involves novelty in both method and apparatus. In incubators as heretofore constructed, it has been thought necessary to maintain the temperature of the incubating chamber within the required limits by regulation of the heat at the heat source. This has usually been done through a system of control valves operating in conjunction with a ventilating system.

The disadvantage of such a method of regulation, however, is that a considerable period of time must elapse before the regulating effect is felt in the incubating chamber, during which period the temperature in the chamber is unaffected by such regulation, continuing to rise or fall, as the case may be. In other words, there is a lag between the point at which it becomes essential to change the temperature within the chamber and the point at which such temperature is actually changed and this lag represents the critical point during which time injury may result to the eggs through the failure of the apparatus to be sufficiently responsive. More than this, under such a method and apparatus it is necessary that careful attention be given at all times to the regulation of the heat and ventilation.

To the end therefore of providing a method and apparatus which will be instantly responsive to changes of temperature in the incubating chamber and which will operate automatically so as to dispense with the necessity for any close supervision, I have devised my present invention.

My incubator is characterized by the provision of a heating chamber which is located relatively remote from the incubating chamber and hence may be maintained at a much higher degree of temperature than could be safely applied where the heating distributing medium, as hot water pipes, are located closely to the incubating chamber. In connection with such a chamber I provide for automatically mixing cold air in sufficient volume with the heated air to bring the same to the proper temperature and for automatically circulating such mixture through and around the incubating chamber under conditions which enable me instantly to correct any deficiencies of temperature in the incubating chamber. This is accomplished through the use of a thermostatically controlled fan placed directly in the heating chamber adjacent the suction fan which draws in the cold air. By such a method I not only obtain a circulation of air of the proper temperature but one which is instantly responsive. This not only results in a conservation of heat, with resultant economy of operation, but avoids the necessity of maintaining the temperature of the heating chamber at anything approximating a constant temperature in that the system is responsive to the temperature of the circulated air which is passed through the incubating chamber rather than to the temperature of the heating chamber or the heat source for said chamber as has heretofore been the case.

In addition to these features, my invention involves certain structural advantages in respect to economy of floor space, sanitation and general absence of complicated operating mechanism. My incubator requires the minimum of attention while providing for the incubation of the maximum number of eggs and with the maximum convenience of handling.

In the accompanying drawings, I have shown a form of incubator which I have found entirely satisfactory in actual use in the practice of my method.

Fig. 1 is a perspective view from the front with one of the egg compartment doors, and one of the doors to the heat distributing chambers open.

Fig. 2 is a fragmentary perspective of one of the egg trays removed.

Fig. 2a is a detached view of the control slide between the heat reservoir and mixing chamber.

Fig. 3 is a vertical section through the incubator of Fig. 1, and

Figs. 4 and 5 are sections on the line 4—4 and 5—5, respectively, of Fig. 3.

Considering the apparatus as a unit, I provide a bottom wall 1, a rear wall 2, a front wall 3, a top wall 4, and end walls 5. The included space may be sub-divided as desired, into individual incubating chambers 6. As here shown, I sub-divide vertically as at 7 and horizontally as at 8 to provide four chambers, but it is obvious that the incubator may consist of any number of sections and that such sections may be arranged in any manner most economically to utilize the available floor space.

According to my concept, the space 9 between the partition 8 and top wall 4 constitutes a heat reservoir which extends continuously over the incubating chambers 6 in communicating relation thereto, as appears in Fig. 3. Heat is supplied to the chamber 9 from any suitable heat source. As here shown, the chamber 9 is heated by means of one or more hot water pipes 10 extending longitudinally thereof and supplied by any suitable heating plant as the hot water heater 11 (Fig. 1). Obviously, however, the chamber 9 may be heated in any desired manner from any suitable heat source located in any convenient relation to the incubator. Similarly, the heating chamber 9 may be variously located with reference to the incubating chambers so long as it is relatively remotely spaced therefrom as compared with prior art constructions wherein the heat supply pipes are brought as closely to the eggs to be incubated as is practical.

The heat chamber 9 may or may not be vertically partitioned to correspond to the partitioning of the individual incubating chambers. The vertical partitions 7 are provided with spaced cleats 13 constituting supporting guides for the series of egg trays 12 which are thus insertible and removable by simple endwise sliding movement. Preferably each tray is constructed with raised front and back walls 12' and 12² which substantially contact those of the tray next above and by means of which the trays are adapted for interchangeable use.

By providing each tray with an open bottom support, as the mesh bottom 12ᵃ, proper circulation of heated air through the tray series is assured, and by spacing the tray series itself as indicated at 14 from the one vertical wall of the housing, as the front wall thereof, and as at 15 from one horizontal wall of the housing, as the bottom wall thereof, I obtain a continuous circulation of the heated air both through and around the tray series. Access to the tray series may be had through the outwardly swinging doors 16 of the front of the housing.

Fresh aid is drawn into the incubator chambers 6 by means of motor driven suction fans 17 mounted in the space 14 slightly above the uppermost tray of each tray series. Access to the fans 17 is had through upwardly swinging doors 18 which are perforated as at 19 for the admission of fresh air into the incubator chambers.

The fresh air drawn into each incubator chamber by the fans 17 is passed through openings 20 in vertically disposed partitions 21 supported above the front edge of the uppermost tray of each tray series and defining with the horizontal partitions 8 and the rear wall of the housing a mixing chamber 22 disposed just above each tray series.

Within each mixing chamber 22 is a series of baffle boards 23 arranged longitudinally thereof and of progressively increasing height from front to rear. These baffles assist to secure a more uniform distribution of the air downwardly through the tray series.

Mounted within the heating chamber 9 adjacent the fans 17 are other motor driven fans 24 which serve to direct the heated air from said chamber into the path of the fresh air drawn into the incubator by the fans 17 so that the respective currents of fresh cold air and hot air are intermixed with each other and the mixture is circulated as a current of suitable temperature about and through the egg trays.

Preferably the fans 24 are arranged directly above the fans 17, the partition 8 being opened at the proper places as indicated at 25 to permit the heated air to be forced from the heating chamber 9 into the mixing chamber 22 by the fans 24, as shown by the arrows in Fig. 3.

The fans 24 are thermostatically controlled as indicated at 26 each thermostat being operatively connected at 27 with a fan switch 28. By arranging the thermostats 26 within the mixing chamber 22 the apparatus is made instantly responsive to temperature variations in the current of air which is being circulated through and about the egg trays. Under certain circumstances the fans 24 are not necessary because the fan 17 as it rotates between the fresh air inlet 19 and the passageway 25 from the heating chamber 9 tends to draw in and deliver to the mixing chamber 22 both fresh and heated air, it being possible so to adjust the opening or passageway 25 that a greater or less amount of heat will be sucked in by the fan and delivered to the chamber 22. In warmer climates but very little heat needs to be added to the natural air in order to bring the same to incubating temperature. Under these circumstances there would be no need for the fan 24 whereas on cold winter or early spring days in colder climates these fans would be necessary in order for the hatching temperature in the mixing chamber 22 to be maintained.

In order to permit the current of air being circulated around and through the trays to be returned into the mixing chamber for mixture with the respective streams of cold fresh air and heated air furnished by the fans 17 and 24, respectively, the fans 17 and the mountings therefor are spaced from the partitions 20 as indicated at 29, Fig. 3. In order to prevent such current from escaping through the fresh air inlet opening 19, the fans 17 are each vertically baffled at either side by the lateral baffles 30, and in order to prevent the heated air delivered by the fans 24 from escaping through said inlet openings, each fan is horizontally baffled by the horizontal baffles 31, (Figs. 3 and 4).

The foul air is exhausted through the exit openings 32. If desired, additional fresh air may be admitted into the heating chamber 9 as by means of one or more fresh air inlets 33 (Figs. 3 and 5). In fact, the arrangement and number of both fresh air inlet and foul air exit openings may be greatly varied according to prevailing conditions as may also many other minor details of arrangement and construction.

I have made no attempt to illustrate other than conventionally the thermostat and fan switch, as these are standard, and have only indicated diagrammatically the wiring W for the several fans.

If desired, I may arrange in controlling relation to the openings 25, which connect the chambers 9 and 22 volume-control slides 40 (Figs. 3 and 2ᵃ). Each slide 40 is guided in a suitable guideway 41 (Fig. 3) and is provided with a plurality of openings 42 (Fig. 2ᵃ) selectively registrable with the opening 25. By varying the position of the slide with respect to the opening 25, a larger or smaller opening 42 may be registered with 25 according to prevailing conditions of temperature, as hot or cold weather.

Various other modifications in method and apparatus may obviously be resorted to within the spirit and scope of my invention as defined by the appended claims.

What I therefore claim and desire to secure by Letters Patent is:

1. In an incubator, a walled housing partitioned to provide an incubating chamber and an air tempering chamber, egg trays removably supported within the incubating chamber and dimensioned to leave top and bottom spaces and a vertical passage connecting the same, said top space opening into said tempering chamber, said housing having a fresh air opening beneath said tempering chamber and laterally of said top space, means arranged between said openings drawing tempered air from said tempering chamber and fresh air through said fresh air opening, and mixing and forcing the mixture into said top space and thence throughout the egg trays.

2. In an incubator, a walled housing partitioned to provide an incubating chamber and an air tempering chamber, egg trays removably supported within the incubating chamber and dimensioned to leave top and bottom spaces and a vertical passage connecting the same, said top space opening into said tempering chamber, said housing having a fresh air opening beneath said tempering chamber, means arranged between said openings drawing tempered air from said tempering chamber and fresh air through said fresh air opening, and mixing and forcing the same into said top space and thence throughout the egg trays, and means preventing escape of said tempered air through said fresh air admission opening.

3. In an incubator comprising a walled housing having a fresh air admission opening, egg trays supported by the walls of said housing and dimensioned to leave top and bottom spaces and a vertical passage connecting the same for the return passage of air, a horizontal partition extending inwardly from said casing below said fresh air opening and separating the same from said return air passage to define a passage through which the return air passes to the space above the egg trays, a similar partition above said fresh air opening and spaced from the top of said housing to define therewith an air passage to the top space above the egg trays, vertical partitions carried by said housing and uniting said horizontal partitions to provide an open ended chamber about the fresh air opening, a tempered air source delivering tempered air to said passage above said upper partition, means mounted in the inner open end of said chamber and adapted simultaneously to draw a stream of fresh air from said fresh air opening, a stream of tempered air from said tempered air source through said passage above the chamber, and the stream of return air from said return air passage, mix and deliver the same to said space above the egg trays, whence the same is distributed throughout the egg trays.

4. An incubator comprising a walled housing having a fresh air admission opening, a series of superimposed tray supports carried by opposite walls of said housing and spaced from top and bottom thereof to leave chambers above and below the tray stack, a series of egg trays removably mounted on said supports and of less dimension from front to rear than the housing and each having one edge substantially contacting with that of the tray next adjacent whereby a passage is defined between said contacting edges and one wall of said housing for circulation of air between the top and bottom chambers, baffle plates in said top chamber arranged to distribute the air evenly throughout said stack, means to temper the air circulated through said stack, means for positively circulating the air through said housing, and means arranged adjacent said fresh air admission opening for mixing the fresh air with the tempered air.

5. An incubator comprising a walled housing having a fresh air admission opening, a series of superimposed tray supports carried by opposite walls of said housing and spaced from top and bottom thereof to leave chambers above and below the tray stack, a series of egg trays removably mounted on said supports and dimensioned to leave a connecting passage adjacent one wall of said housing for circulation of air between the top and bottom chambers, means for tempering the air within said top chamber, means for positively circulating the tempered air therefrom about and through the egg trays, baffle plates of progressively increasing height from front to rear arranged in said top chamber longitudinally thereof for distributing the air evenly throughout said tray stack, and means arranged opposite said fresh air opening for mixing fresh air with said tempered air.

6. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for tempering the air in said tempering chamber, a fan arranged adjacent the opening of said top space into said tempering chamber for forcing tempered air from said tempering chamber into said top space, and a fan arranged adjacent said fresh air admission opening for forcing a current of fresh air into the top space of the incubator chamber for mixture with the tempered air, said fans cooperating to circulate the tempered mixture about the trays.

7. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for supplying suitably tempered air to said tempering chamber, a fan arranged adjacent the opening of said top space into said tempering chamber for forcing tempered air from said tempering chamber into said top space, and a fan arranged adjacent said fresh air admission opening for forcing a current of fresh air into the top space above the incubator chamber for mixture with the tempered air, said fans cooperating to circulate the tempered mixture about said trays, and a series of baffles of progressively increasing height arranged in said top space for deflecting the mixture downwardly.

8. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for tempering the air in said tempering chamber, a fan arranged adjacent the opening of said top space into said tempering chamber for forcing tempered air from said tempering chamber into said top space, and a fan arranged adjacent said fresh air admission opening for forcing a current of fresh air into the top space above the incubator chamber for mixture with the tempered air, said fans cooperating to circulate the tempered mixture about said trays, and laterally disposed baffles on either side of said last named fan for preventing loss of the circulated mixture through said air admission opening.

9. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for tempering the air in said tempering chamber, a fan arranged adjacent the opening of said top space into said tempering chamber for forcing tempered air from said tempering chamber into said top space, and a fan arranged adjacent said fresh air admission opening for forcing a current of fresh air into the top space above the incubator chamber for mixture with the tempered air, said fans cooperating to circulate the tempered mixture about said trays, and a horizontally disposed baffle above said last named fan for preventing loss of the tempered air through said air admission opening.

10. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for tempering the air in said tempering chamber, a fan arranged adjacent the opening of said top space into said tempering chamber for forcing tempered air from said tempering chamber into said top space, and a fan arranged adjacent said fresh air admission opening for forcing a current of fresh air into the top space above the incubator chamber for mixture with the tempered air, said fans cooperating to circulate the tempered mixture about said trays, and laterally disposed baffles on either side of said last named fan for preventing loss of the circulated mixture through said air admission opening, and a horizontally disposed baffle above said last named fan for preventing loss of the tempered air through said air admission opening.

11. In an incubator, a walled housing having a fresh air admission opening and partitioned to provide an incubator chamber and a superposed tempering chamber, egg trays removably supported within said incubator chamber and dimensioned to leave top and bottom spaces and a vertical passage connecting the same, said top space opening into said tempering chamber, means for tempering the air in said tempering chamber, a fan arranged adjacent the opening of said top space into said tempering chamber for forcing tempered air from said tempering chamber into said top space, and a fan arranged adjacent said fresh air admission opening for forcing a current of fresh air into the top space above the incubator chamber for mixture with the tempered air, said fans cooperating to circulate the tempered mixture about said trays, and a series of baffles of progressively increasing height arranged in said top space for deflecting the mixture downwardly, and laterally disposed baffles on either side of said last named fan for preventing loss of the circulated mixture through said air admission opening, and a horizontally disposed baffle above said last named fan for preventing loss of the tempered air through said air admission opening.

12. An incubator comprising a walled housing, having a fresh air admission opening and a foul air exit opening, a series of spaced superimposed tray supports within said housing, a series of superimposed egg trays removably mounted on said supports and of less dimension front to rear than the housing and each having one edge substantially contacting with that of the tray next adjacent whereby a passage is defined between said contacting edges and one wall of said housing for the circulation of air, a tempered air source, and means arranged adjacent said fresh air admission opening for mixing the fresh air with the tempered air supplied from said tempered air source, and means for deflecting said air downwardly through the trays, said air returning to said mixing means through said passage.

13. An incubator comprising a walled housing having an air admission opening, means for suitably tempering said air, and a series of egg trays removably carried by the walls of said housing and spaced from the top and bottom to leave chambers above and below the tray stack and of less dimension from front to rear than the housing, and each having one edge substantially contacting with that of the tray next adjacent whereby a passage is defined between said contacting edges and one wall of said housing for the return passage of air, and means in said top chamber arranged to cause the air to circulate downwardly through said stack, said bottom chamber and said return passage.

14. An incubator comprising a walled housing having egg trays supported by opposite walls of said housing and dimensioned to leave top and bottom spaces, and a vertical passage connecting the same for the return passage of air, vertically disposed partitions carried by said housing and a horizontal partition partially connecting the same and defining a compartment above said air passage, said housing having an opening into said compartment for the admission of fresh air thereto, one of said vertical partitions having an opening into said top space above said egg trays, a tempered air source furnishing tempered air to said top space and means for forcing a current of fresh air into said top space for mixture with the tempered air, and means for directing said tempered air downwardly through said trays to said bottom space, said air returning to said upper space through said passage and said opening in said compartment.

15. In an incubator, a walled housing having a fresh air inlet opening and a plurality of egg trays carried by opposite walls of said housing, the front edges of which trays contact and are spaced from one wall of said housing to provide an air return passage, an air mixing chamber disposed between said trays and said return air passage, said fresh air inlet communicating with said air mixing chamber, means disposed between said inlet and said return passage directing said returned air into said air mixing chamber, means for mixing said fresh and said returned air and means for circulating said mixture throughout the trays, the same returning to said mixing chamber by said return passage.

16. In an incubator, a walled housing having a fresh air inlet opening and a plurality of egg trays carried by opposite walls of said housing, the front edges of which trays contact and are spaced from one wall of said housing to provide an air return passage, an air mixing chamber disposed between said trays and said return air passage, baffles above and below said air inlet, said baffle below said inlet separating said fresh air inlet from said air return passage and directing said returned air into said air mixing chamber, means for mixing said fresh, tempered and said returned air and means for circulating said mixture throughout the incubating chamber, the same returning to said mixing chamber by said return passage, a tempered air reservoir carried by said housing, said baffle above said air inlet directing tempered air into said mixing chamber.

17. In an incubator, a walled housing having a fresh air inlet opening and partitioned to provide an incubating chamber and an air return passage, an air mixing chamber disposed between said incubating chamber and said return air passage, said fresh air inlet communicating with said air mixing chamber, baffles above and below said air inlet, said baffle below said inlet separating said fresh air inlet from said air return passage and directing said returned air into said air mixing chamber, means for mixing said fresh and said returned air and means for circulating said mixture throughout the incubating chamber, the same returning to said mixing chamber by said return passage, a tempered air reservoir carried by said housing, said baffle above said air inlet directing tempered air into said mixing chamber.

18. In an incubator, a walled housing having a fresh air inlet and partitioned to provide an incubating chamber having a plurality of egg trays spaced from one wall of said housing to provide an air return passage, an air mixing chamber communicating with said incubating chamber, a tempered air reservoir remote from said egg trays, baffles above and below said fresh air inlet, said upper baffle directing tempered air from said tempered air reservoir to said air mixing chamber and said baffle below said inlet directing the circulated air on its return from said return passage into said air mixing chamber, means for mixing a current of said fresh air with a current of said tempered air and a current of said returned air and means for circulating the same throughout the trays.

19. An incubator comprising a walled housing having a fresh air admission opening and a foul air exit opening, a series of superimposed tray supports carried by opposite walls of said housing and spaced from top and bottom thereof to leave chambers above and below the tray stack, a series of superimposed egg trays removably mounted on said supports and spaced from one wall of said housing whereby a passage is defined between said wall and egg trays for the circulation of air past the trays, means for tempering the air within said top chamber, means arranged in said top chamber for causing the air to circulate downwardly through said trays, means for deflecting the tempered air throughout said trays and means arranged adjacent said fresh air admission opening for supplying fresh air to the air mixture before distributing the same throughout the trays, said air returning to said top chamber by way of said passage between said wall and said egg trays.

20. An incubator comprising a walled housing having a fresh air admission opening, and a foul air exit opening, a series of superimposed tray supports carried by opposite walls of said housing and spaced from top and bottom thereof to leave chambers above and below the tray stack, a series of superimposed egg trays removably mounted on said supports and of less dimension from front to rear than the housing and each having one edge substantially contacting with that of the tray next adjacent whereby a passage is defined between said contacting edges and one wall of said housing for the circulation of air past the trays, means for tempering the air, means for causing the tempered air to circulate downwardly through said trays, and means for deflecting the tempered air throughout said trays and means arranged adjacent the fresh air admission opening for supplying fresh air to the air mixture before distributing the same throughout the trays, said air returning to said top chamber by way of said passage between said wall and said egg trays.

21. An incubator comprising a walled housing having a fresh air admission opening, egg trays supported by the walls of said housing and dimensioned to leave top and bottom spaces and a vertical passage connecting the same for the return passage of air, a tempered air source delivering tempered air directly to said upper space, a fresh air source delivering fresh air directly to said upper space for mixture therein with said tempered air, positive means in said upper space for directing said air mixture evenly throughout the egg trays, said air returning to said top space through said vertical passage for admixture therein with new fresh air and tempered air and so mixed being again directed evenly through the trays by said means in said top space.

22. An incubator comprising a walled housing having a fresh air admission opening and a foul air exit opening, a series of superimposed tray supports carried by opposite walls of said housing and spaced from top and bottom thereof to leave chambers above and below the tray stack, a series of superimposed egg trays removably mounted on said supports and spaced from one wall of said housing whereby a passage is defined between said wall and egg trays for the circulation of air past the trays, means for tempering the air, means for causing the air to circulate through the trays, and means supplying fresh air to the air mixture before the same is distributed, said air returning to said air mixing means by way of said passage between said wall and egg trays.

23. In an incubator, a walled housing having a fresh air admission opening and an incubating chamber, egg trays removably supported within said incubating chamber and dimensioned to leave top and bottom spaces and a vertical passage connecting the same, a tempered air source communicating with said top space and delivering tempered air thereto, means for forcing a current of fresh air into said top space for mixture therein with said tempered air, means between said top space and said return passage separating said passage from said fresh air opening, said used air returning through said passage and being guided into said top space by said last named means so as to be mixed therein with new tempered air and fresh air.

24. In an incubator, a walled housing having a fresh air inlet opening and a plurality of egg trays carried by opposite walls of said housing, the front edges of which trays contact and are spaced from one wall of said housing to provide an air return passage, an air mixing chamber disposed between said trays and said return air passage, said fresh air inlet communicating with said air mixing chamber, means disposed between said inlet and said return passage directing said returned air into said air mixing chamber, means for mixing said fresh and said returned air, means for circulating said mixture throughout the trays, the same returning to said mixing chamber by said return passage, and a tempered air source delivering tempered air to said mixing chamber for mixture therein with said returned air and said fresh air.

25. An incubator comprising a walled housing having a fresh air inlet and a plurality of egg trays carried by opposite walls of said housing and spaced from one wall of said housing to provide an air return passage, an air mixing chamber disposed between said trays and said return passage, said fresh air inlet communicating with said air mixing chamber, means directing said returned air into said air mixing chamber, means for mixing said fresh air and said returned air and means for circulating said mixture throughout the trays, the same returning to said mixing chamber by said return passage.

26. An incubator comprising a walled housing having a fresh air inlet and a plurality of egg trays carried by opposite walls of said housing and spaced from one wall of said housing to provide an air return passage, an air mixing chamber disposed between said trays and said return passage, said fresh air inlet communicating with said air mixing chamber, means directing said returned air into said air mixing chamber, means for mixing said fresh air and said returned air, and means for circulating said mixture throughout the trays, the same returning to said mixing chamber by said return passage, a tempered air source delivering tempered air to said mixing chamber for mixture therein with said returned air and said fresh air.

ALBERT PORTER DAVIDSON.